(12) United States Patent
Kyle

(10) Patent No.: US 6,378,555 B2
(45) Date of Patent: Apr. 30, 2002

(54) VALVED COUPLINGS FOR RV SEWER HOSE

(76) Inventor: Charles E. Kyle, 5970 Liberty Ave., Vermilion, OH (US) 44089

( * ) Notice: Subject to any disclaimer, the term of this patent is extended or adjusted under 35 U.S.C. 154(b) by 0 days.

(21) Appl. No.: 09/842,588

(22) Filed: Apr. 26, 2001

Related U.S. Application Data
(60) Provisional application No. 60/201,519, filed on May 2, 2000.

(51) Int. Cl.[7] ............................................... F16L 37/28
(52) U.S. Cl. ....................................... 137/613; 137/899
(58) Field of Search ............................... 137/613, 899; 251/326

(56) References Cited

U.S. PATENT DOCUMENTS

| | | | |
|---|---|---|---|
| 4,550,453 A | * 11/1985 | Norman | 4/323 |
| 5,938,174 A | * 8/1999 | Gunder et al. | 251/326 |
| 5,947,156 A | * 9/1999 | Tomczyk | 137/899 |
| 5,971,438 A | * 10/1999 | Johnson | 285/12 |
| 5,988,221 A | * 11/1999 | Walker | 137/899 |
| 6,006,766 A | * 12/1999 | Soulages | 134/166 C |

OTHER PUBLICATIONS

David Garvin, Spring 2001 Camping World, pp. 54–57—Sanitation.

* cited by examiner

Primary Examiner—Kevin Lee
(74) Attorney, Agent, or Firm—Sand & Sebolt

(57) ABSTRACT

The sewer hose for a recreational vehicle includes a valve coupling disposed at both ends of the sewer hose so that the body of the sewer hose may be closed off after the sewer hose is used to empty the holding tank of the recreational vehicle. The valve couplings and sewer hose have exterior dimensions small enough to fit in the standard sewer hose storage compartment.

19 Claims, 7 Drawing Sheets

US 6,378,555 B2

VALVED COUPLINGS FOR RV SEWER HOSE

CROSS REFERENCE TO RELATED APPLICATIONS

This application claims priority from U.S. Provisional Patent Application Ser. No. 60/201,519 filed May 2, 2000.

BACKGROUND OF THE INVENTION

1. Technical Field

The present invention generally relates to sewer lines for recreational vehicles and, more particularly, to a coupling that is used on two ends of a sewer hose to prevent leakage from the hose after the sewer hose is used to empty the sewage holding tank on the recreational vehicle. Specifically, the present invention is related to a valved sewer hose coupling having a sliding valve disposed between a pair of rigid tube sections that receive sections of flexible sewer line.

2. Background Information

Touring in recreational vehicles (RVs) has become increasingly popular in recent years. Most new RVs include a lavatory that empties into a holding tank that temporarily holds the sewage until the tank is pumped out or emptied into an appropriate waste treatment system.

Most RV camping areas have power hook ups, fresh water hook ups, and a sewage disposal system that may be used by the owner of the recreational vehicle for a fee. The sewage disposal system typically includes an inlet disposed at ground level near the camping area. The user of the recreational vehicle connects with the sewage disposal system by using a sewer hose to connect an outlet of the holding tank to the inlet to the sewage disposal system. The outlet of the holding tank is typically valved to prevent unintended release.

Once the sewer hose is connected, the user opens the valve to the holding tank and allows the tank to empty into the sewage system. The user then closes the valve to the holding tank and disconnects the sewer hose. A problem with this system is that the residue inside the sewer hose often leaks or drips out onto the ground while the sewer hose is being stored. The result is that the ground around the RV is contaminated with sewage leaving it undesirable for camping. The contamination is especially unpleasant when the users of the RV are cooking out or sitting outside the RV. The leakage can also lead to environmental harm that may lead to liability for the campgrounds. The art thus desires a sewer hose for an RV that does not create the leaking problem of the past. Such a sewer hose must be able to be stored in the same storage container as present sewer hoses. These hoses are typically stored in the bumper of the RV. The storage container has a limited cross sectional area and length that prevents the solution from having large dimensions.

BRIEF SUMMARY OF THE INVENTION

The present invention provides an RV sewer hose having valved ends that allow the body of the sewer hose to be sealed to prevent residual sewage from leaking from the hose after the hose has been used to empty the holding tank of an RV. In one embodiment, the invention provides a valved sewer hose has exterior dimensions that are smaller than the interior dimensions of the RV bumper so that the valved sewer hose may be stored inside the bumper. In another embodiment of the invention, the valves disposed at each end of the sewer hose are manually-operated and include covers that prevent the user from contacting any residual sewage when the user opens the valves.

The invention also provides a valved coupling for an RV sewer hose that may be selectively connected to existing sewer hoses. In this embodiment of the invention, the invention provides a valved coupling having one end that connects to the sewer hose and another end that connects with the sewage disposal system or the outlet to the holding tank.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended Claims.

Similar numbers refer to similar parts throughout the specification.

DESCRIPTION OF THE PREFERRED EMBODIMENTS

Figure 1:
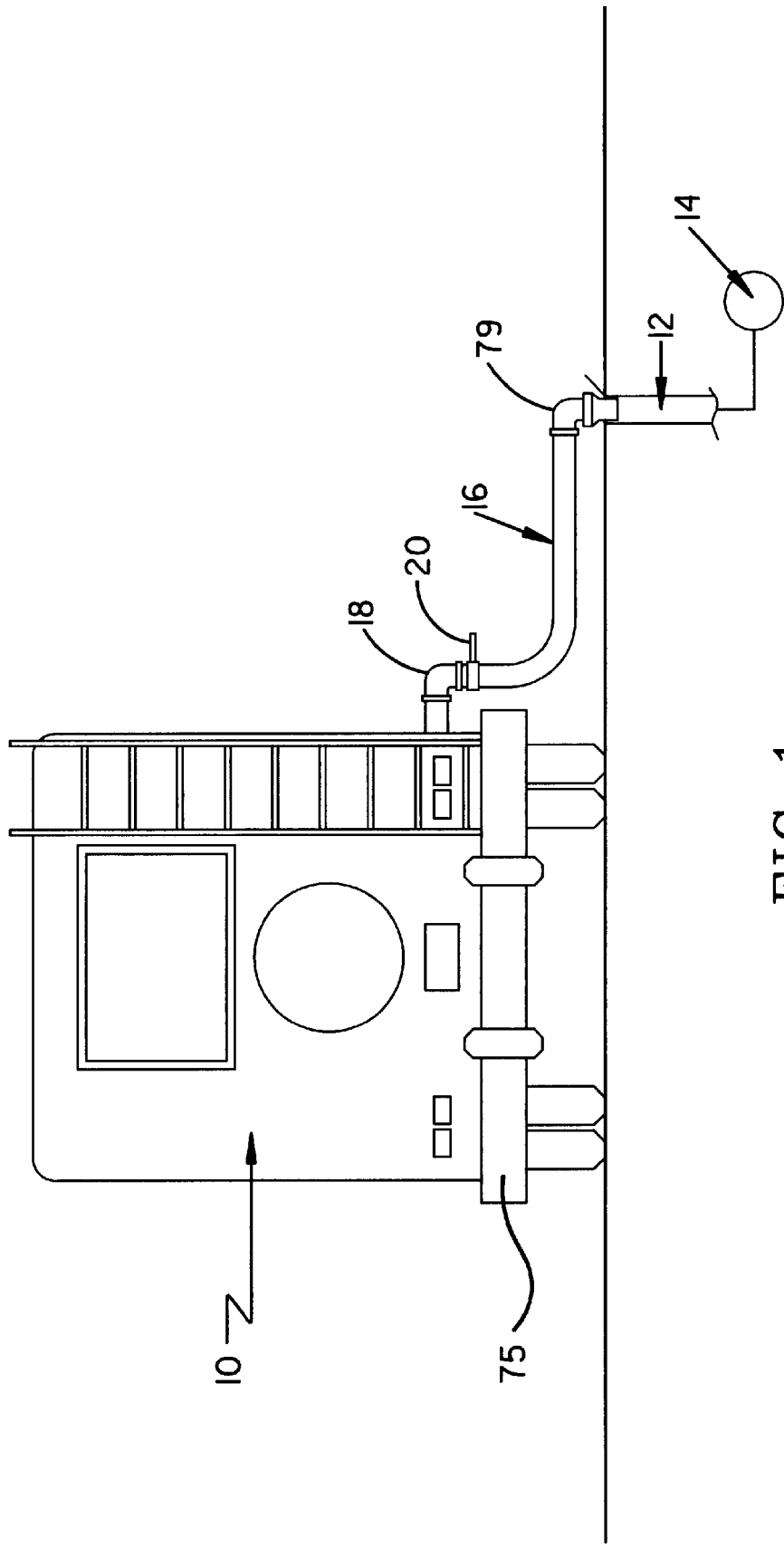
FIG. 1 is a view of a prior art recreational vehicle hooked up to a prior art sewage disposal system with a prior art sewer line.
Figure 2:
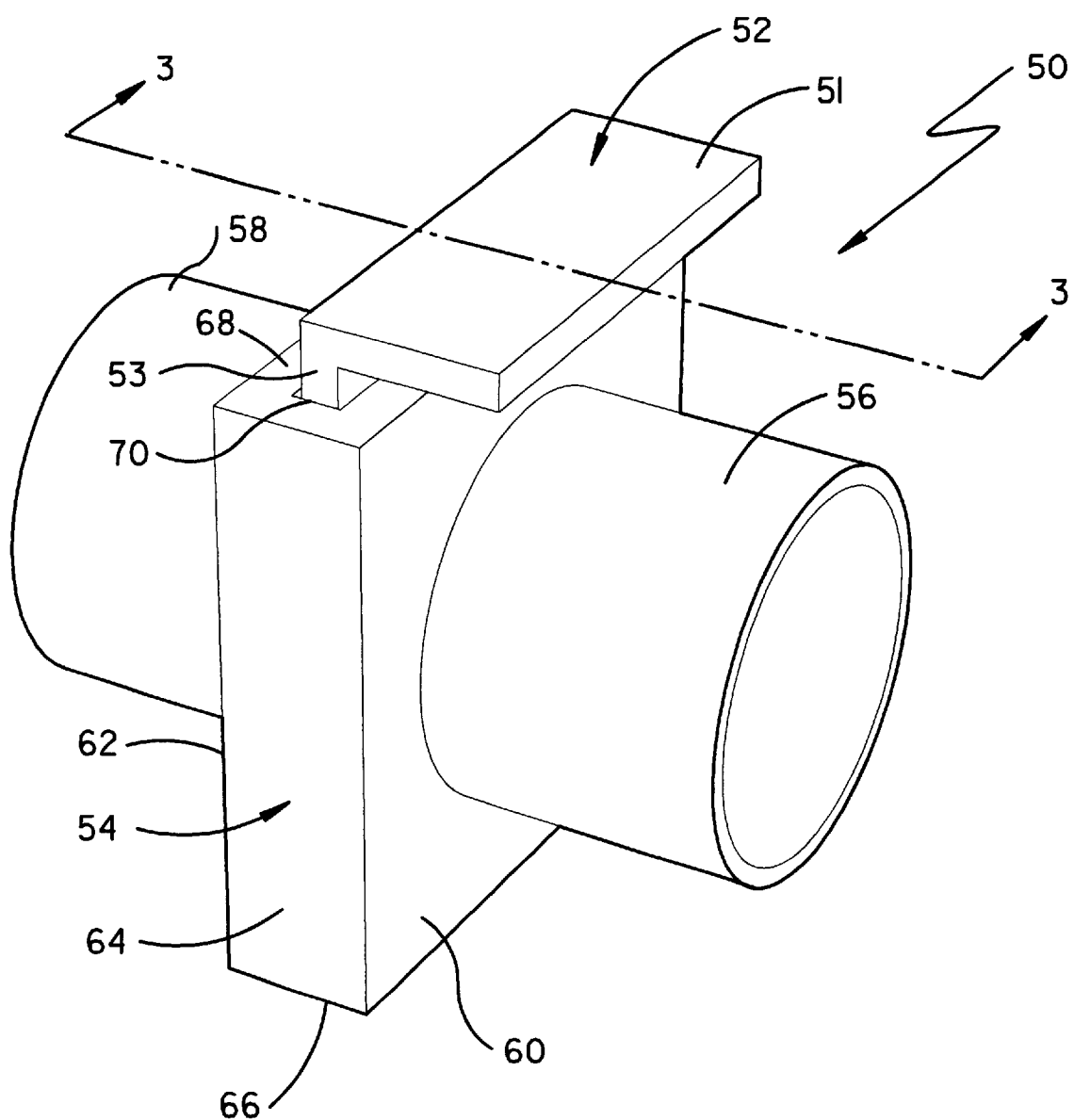
FIG. 2 is a perspective view of the valved coupling of the present invention.
Figure 3:
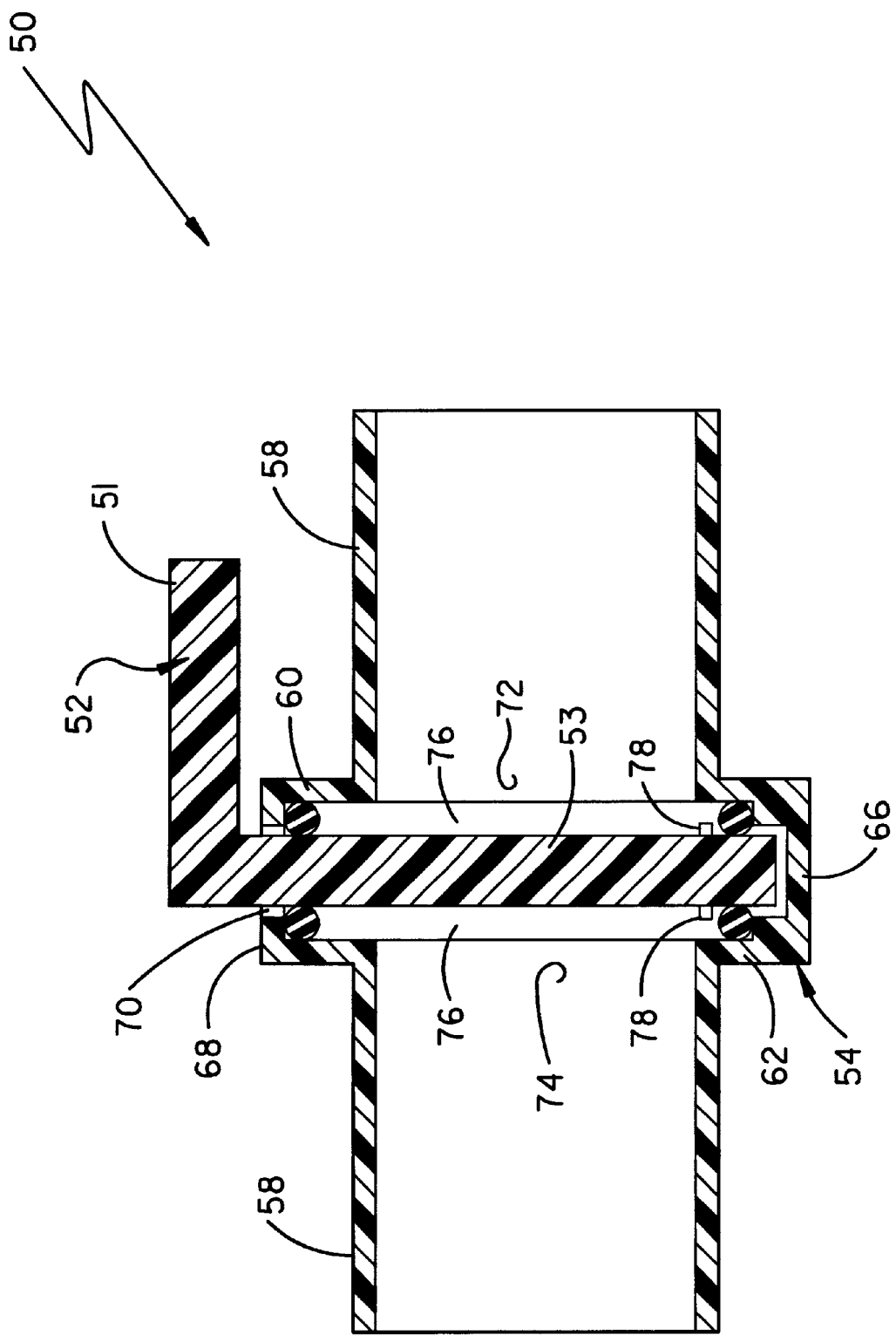
FIG. 3 is a sectional view taken along line 3—3 of FIG. 2.
Figure 4:
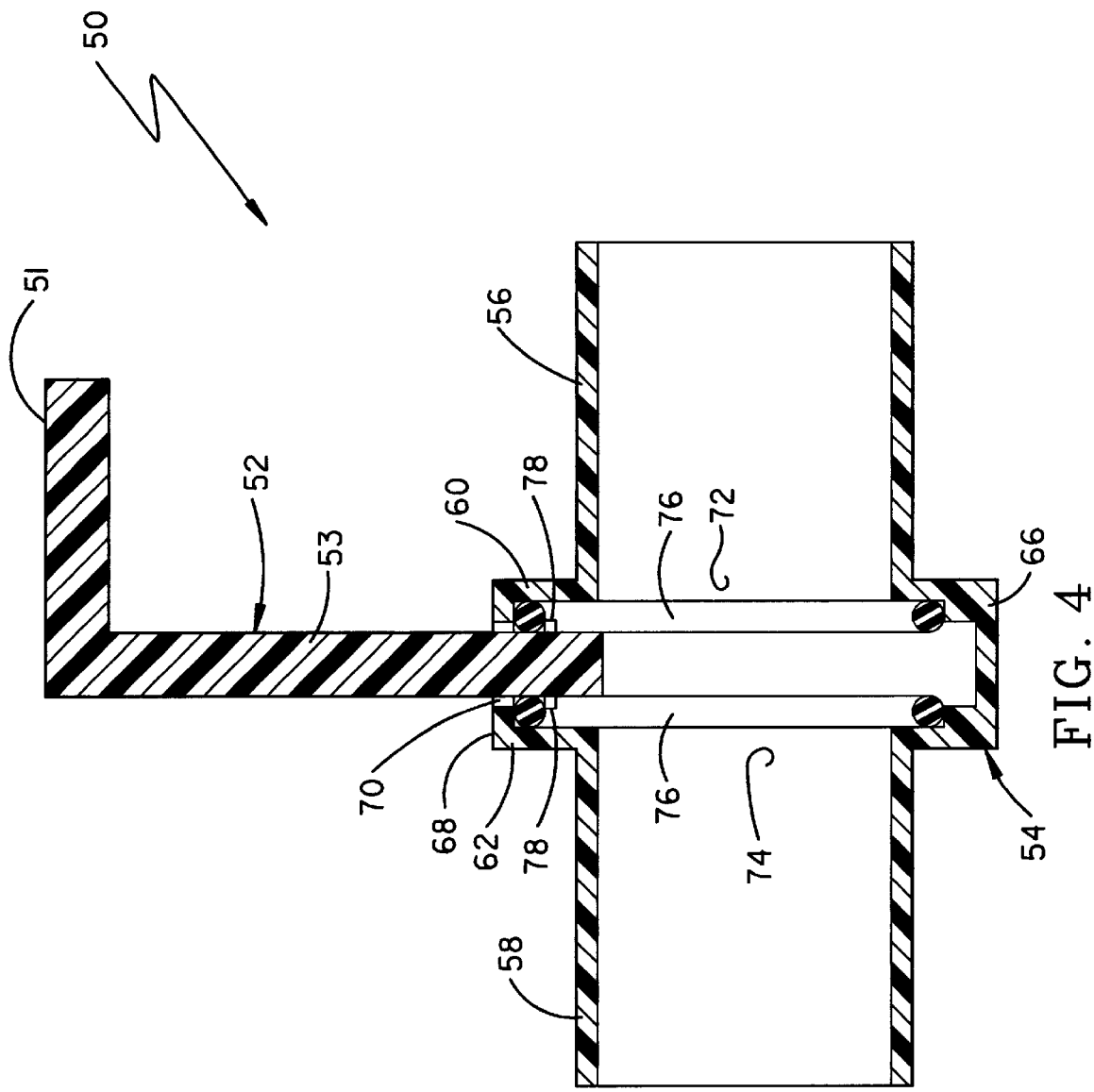
FIG. 4 is a view similar to FIG. 3 with the valve door in the open position.

In the prior art arrangement depicted in FIG. 1, a recreational vehicle 10 is emptying its holding tank (not shown) into the inlet 12 of a sewage disposal system 14. A prior art sewer hose 16 is connected to the outlet 18 of the holding tank below the valve 20. The user opens valve 20 and allows the holding tank to empty into system 14. When empty, the user closes valve 20 and disconnects hose 16 from system 14. The undesirable leaking occurs when hose 16 is being disconnected and stored.

The valved coupling of the present invention is indicated generally by the numeral 50 in FIGS. 2 through 5. Coupling 50 includes a manually operable valve door 52 carried by a valve body 54. Door 52 includes a handle 51 and a body 53. In the preferred embodiment of the invention, handle 51 is substantially perpendicular to body 53 in order to decrease the dimensions of coupling 50. In other embodiments, handle 51 may be a finger recess or finger hole in body 53. First and second 56 and 58 tube sections extend outwardly from either side of valve body 54. Tube sections 56 and 58 preferably has three inch outside diameters. Coupling 50 may be used to selectively close an end of sewer hose 16 by connecting hose 16 to one of tube sections 56 and 58. Both ends of hose 16 may be selectively closed by connected one coupling to each end of hose 16. The end of hose 16 may be connected to tube section 56 by sliding the end over tube section 56 and applying a tube clamp the end of hose 16. The user may then close the ends of hose 16 before disconnecting hose 16 to prevent accidental spillage and leakage.

Body 54 includes a front wall 60 and a rear wall 62. A pair of sidewalls 64, a bottom wall 66, and a top wall 68 extend between walls 60 and 62 to form body 54. Top wall 68 defines an opening 70 that slidingly receives valve door 52. Front 60 and rear 62 walls includes openings 72 and 74 so that fluid may flow through coupling 10. Tube sections 56 and 58 are aligned with openings 72 and 74. In the preferred embodiment of the invention, body 54 has a substantially square cross section. In other embodiments of the invention, body 54 may be round. Body 54 and handle 52 preferably have combined outside dimensions less than 3.75 inches by 3.75 inches so that coupling 50 may be stored in the same located as hose 16. A common storage location is inside of the bumper 75 of RV 10.

Seals 76 are disposed between each opening 72,74 and valve door 52 to prevent liquid from leaking out of coupling 50 when door 52 is open or closed. In the preferred embodiment of the invention, each seal 76 is an O-ring fabricated from a rubber or plastic material that allows door 52 to slide between the open and closed positions.

Door 52 preferably includes a stop 78 or a pair of stops 78 that prevent the user from pulling door 52 past seals 76. Each stop 78 is preferably a protuberance that engages the upper portion of seals 76 when door 52 is in the open position.

Figure 5:
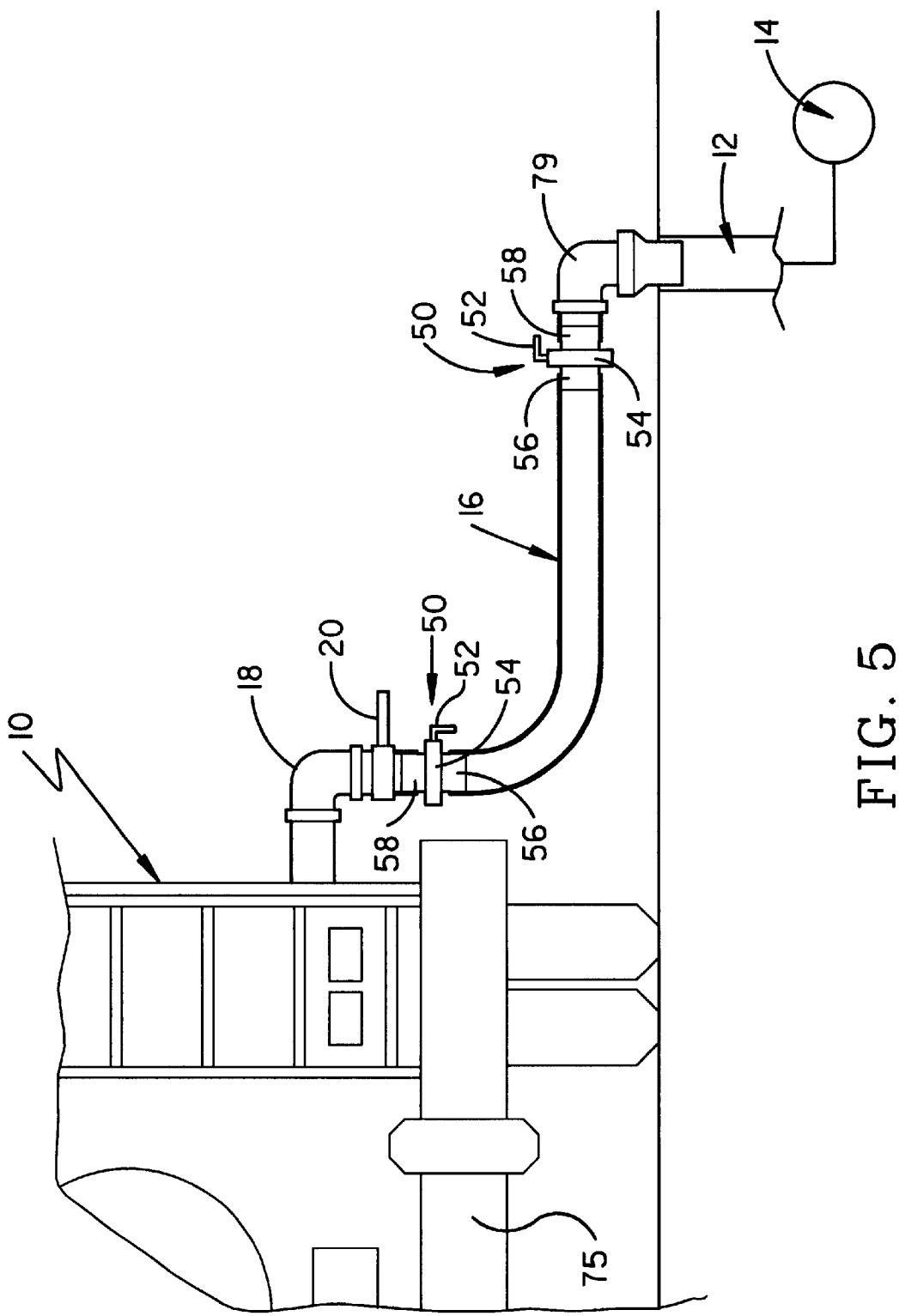
FIG. 5 is a view similar to FIG. 1 showing a pair of the valved couplings being used with s sewer hose.

In use, the user of coupling 50 attaches a coupling 50 to each end of hose 16 as shown in FIG. 5. Valve doors 52 are moved to the closed position. One coupling 50 is connected to outlet 18 below valve 20 with the other coupling 50 being connected to a universal sewer connector 79. Connector 79 is attached to inlet 12 of system 14. The user may connect tube section 58 to universal sewer connector 79 (or any other quick coupling known in the art) with a short length (4 to 6 inch) of flex hose. The connection may be made with auto hose clamps or any of a variety of other connectors known in the art.

The user then opens all valves to empty the holding tank of RV 10. Once the holding tank is empty, the user closes valve 20 and closes doors 52. Hose 16 and couplings 50 may then be removed and stored without the residue inside hose 16 leaking out onto the ground.

Figure 6:
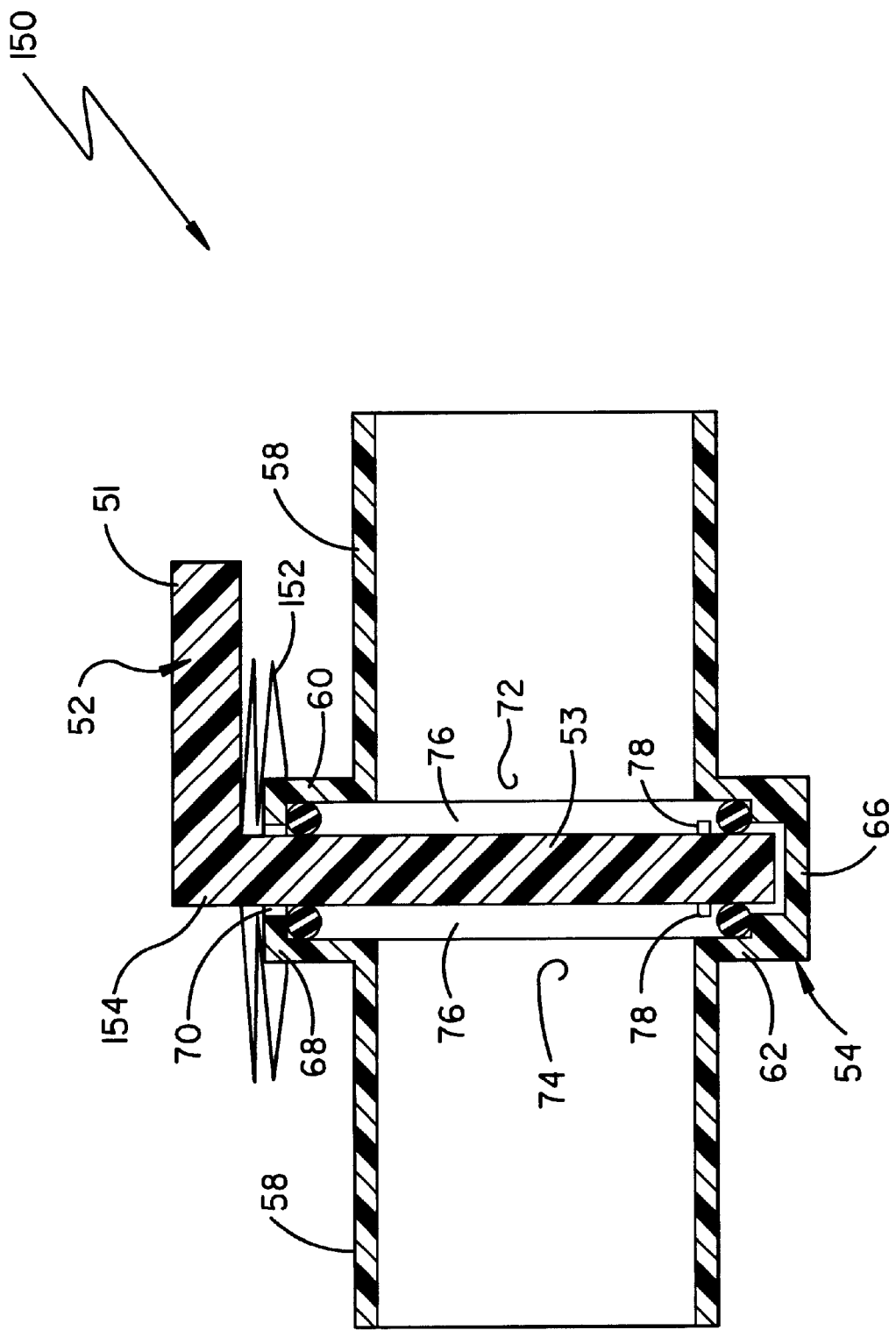
FIG. 6 is a view similar to FIG. 3 showing an alternative embodiment of the invention having a cover around the valve door.
Figure 7:
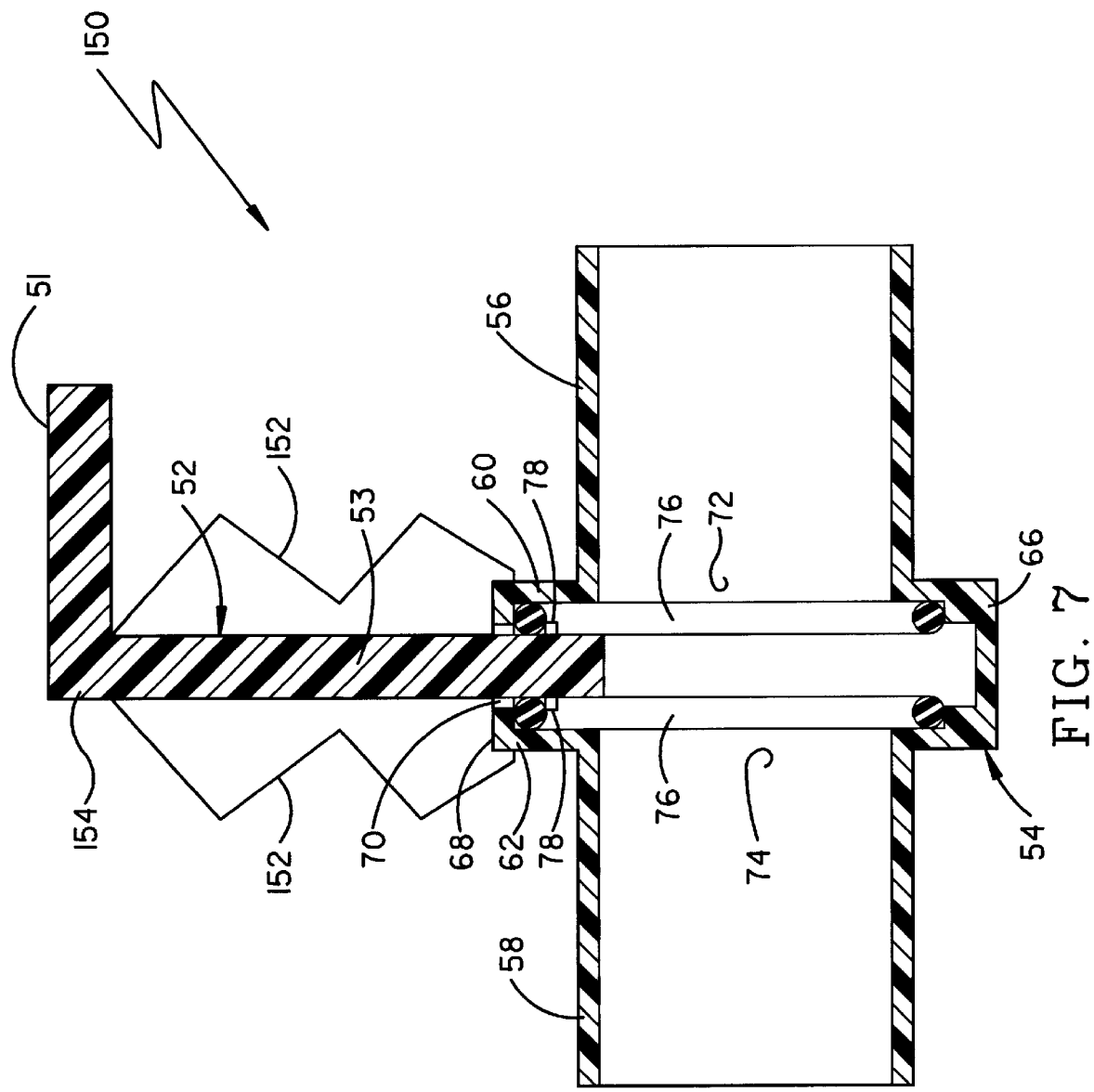
FIG. 7 is a view similar to FIG. 4 showing the embodiment of the invention shown in FIG. 6 showing the valve door open with the cover in an expanded condition.

An alternative embodiment of the coupling is indicated generally by the numeral 150 in FIGS. 6 and 7. Coupling 150 includes many of the same elements as coupling 50 and the same numbers are used to refer to these elements. Coupling 150 includes a cover member 152 disposed between valve body 54 and the top end 154 of valve door 52. Cover member 152 is flexible and moves between the collapsed position depicted in FIG. 6 and an expanded position depicted in FIG. 7. In the embodiment shown in the drawings, cover member 152 is in the form of bellows that expand and contract with the opening and closing of valve door 52. Cover member 152 may be attached to valve body 54 with a sealed connection that prevents any liquid from exiting or entering cover member 152. In another embodiment, cover member 152 is loosely connected to valve body 54 so that the user may wash the inside of cover member 152.

Cover member 152 prevents the user from contacting the outer surfaces of body 53 of valve door 52 when valve door 52 is in the open position depicted in FIG. 7. The outer surfaces of body 53 can be contaminated with sewage and cover members 152 prevent the user from contacting the sewage.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described. For example, the valve couplings of the invention may include flipper valves, pivoting valve doors, or rotating valve doors.

Having now described the features, discoveries and principles of the invention, the manner in which the improved coupling is construed and used, the characteristics of the construction, and the advantageous, new and useful results obtained; the new and useful structures, devices, elements, arrangements, parts and combinations, are set forth in the appended claims.

What is claimed is:

1. A valved sewer hose adapted to empty the holding tank of a recreational vehicle into a sewage disposal system; the holding tank having an outlet; the sewage disposal system having an inlet; the valved sewer hose comprising:

a section of sewer hose having a first end and a second end; the sewer hose defining an inner surface;

a first valve coupling connected to the first end of the sewer hose;

a second valve coupling connected to the second end of the sewer hose;

each valve coupling having a valve door movable between open and closed positions; and the first valve coupling being adapted to connect with the outlet of the holding tank.

2. The valved sewer hose of claim 1, further comprising a universal sewer connector connected to the second valve coupling; the universal sewer connector adapted to connect with the inlet to the sewage disposal system.

3. The valved sewer hose of claim 1, wherein each valve coupling includes:

a valve body having first and second opposed sides;

the valve body defining an opening;

a first tube section connected to the first side of the valve body;

a second tube section connected to the second side of the valve body;

the first and second tube sections extending away from one another;

each tube section defining an opening that is connected to the opening of the valve body; and a valve door slidably carried by the valve body between open and closed positions; the valve door having an upper end protruding from the valve body.

4. The valved sewer hose of claim 3, further comprising a first seal disposed between the first side of the valve body and the valve door and a second seal disposed between the second side of the valve body and the valve door.

5. The valved sewer hose of claim 4, further comprising a stop connected to the valve door; the stop projecting outwardly away from the valve door; the stop being adapted to catch on one of the seal and the valve body to prevent the valve door from being removed from the valve body.

6. The valved sewer hose of claim 5, further comprising a cover member connected to the upper end of the valve door and the valve body; the cover member adapted to cover the valve door when the valve door is in the open position.

7. The valved sewer hose of claim 6, wherein the cover member is fabricated from a flexible material.

8. The valved sewer hose of claim 6, wherein the cover member is in the form of bellows.

9. The valved sewer hose of claim 3, further comprising a handle projecting from the upper end of the valve door.

10. The valved sewer hose of claim 3, wherein the section of sewer hose is disposed over one of the tube sections of the first valve coupling and over one of the tube sections of the second valve coupling.

11. The valved sewer hose of claim 1, wherein each valve coupling has a width and a height; the width and height of each valve coupling being less than 4 inches.

12. The valved sewer hose of claim 11, wherein the width of each valve coupling is 3.75 inches.

13. The valved sewer hose of claim 11, wherein the height of each valve coupling is 3.75 inches.

14. A valved sewer hose adapted to empty the holding tank of a recreational vehicle into a sewage disposal system; the holding tank having an outlet; the sewage disposal system having an inlet; the valved sewer hose comprising:
- a section of sewer hose having a first end and a second end; the sewer hose defining an inner surface;
- a first valve means connected to the first end of the sewer hose for selectively sealing the first end of the sewer hose;
- a second valve means connected to the second end of the sewer hose for selectively sealing the second end of the sewer hose;
- the first and second valve means being moveable between open and closed positions; at least a portion of the valve means extending from the valve means when the valve means is in the open position; and
- the first valve means being adapted to connect with the outlet of the holding tank.

15. The valved sewer hose of claim 14, further comprising cover means for covering the portion of the valve means extending from the valve means when the valve means is in the open position.

16. A valved sewer hose adapted to empty the holding tank of a recreational vehicle into a sewage disposal system; the holding tank having an outlet; the sewage disposal system having an inlet; the recreational vehicle having a bumper defining a storage compartment; the valved sewer hose comprising:
- a section of sewer hose having a first end and a second end; the sewer hose defining an inner surface;
- a first valve coupling connected to the first end of the sewer hose;
- a second valve coupling connected to the second end of the sewer hose;
- each valve coupling having a valve door movable between open and closed positions;
- the first valve coupling being adapted to connect with the outlet of the holding tank; and
- a universal sewer connector connected to the second valve coupling; the universal sewer connector adapted to connect with the inlet to the sewage disposal system;
- each valve coupling including:
  - a valve body having first and second opposed sides;
  - the valve body defining an opening;
  - a first tube section connected to the first side of the valve body;
  - a second tube section connected to the second side of the valve body;
  - the first and second tube sections extending away from one another;
  - each tube section defining an opening that is connected to the opening of the valve body;
  - a valve door carried by the valve body between open and closed positions; the valve door having an upper end protruding from the valve body; and
  - a seal disposed between the valve door and the valve body.

17. The valved sewer hose of claim 16, wherein the section of sewer hose and the valve couplings are adapted to be stored within the storage compartment of the RV bumper.

18. The valved sewer hose of claim 16, wherein further comprising a cover connected to each valve coupling; the cover adapted to cover the valve door when the valve door is in the open position.

19. The valved sewer hose of claim 16, wherein the valve door slides between the open and closed positions.

* * * * *